(12) United States Patent
Han

(10) Patent No.: US 12,172,482 B2
(45) Date of Patent: Dec. 24, 2024

(54) SELF-POWERED DRONE FLYING CAR FOR LAND AND AIR

(71) Applicants: Kyung Hee Han, Yonginsi (KR); AMAZING SUN CO., LTD., Gyeonggi-do (KR)

(72) Inventor: Kyung Hee Han, Yonginsi (KR)

( * ) Notice: Subject to any disclaimer, the term of this patent is extended or adjusted under 35 U.S.C. 154(b) by 0 days.

(21) Appl. No.: 17/767,383

(22) PCT Filed: Nov. 25, 2020

(86) PCT No.: PCT/KR2020/016824
§ 371 (c)(1),
(2) Date: Apr. 7, 2022

(87) PCT Pub. No.: WO2021/107596
PCT Pub. Date: Jun. 3, 2021

(65) Prior Publication Data
US 2024/0075779 A1    Mar. 7, 2024

(30) Foreign Application Priority Data

Nov. 29, 2019   (KR) .......................... 10-2019-0157187

(51) Int. Cl.
| | | |
|---|---|---|
| *B60F 5/02* | (2006.01) |
| *B64C 25/36* | (2006.01) |
| *B64C 25/62* | (2006.01) |
| *B64C 27/20* | (2023.01) |
| *B64C 37/00* | (2006.01) |
| *B64C 39/02* | (2023.01) |
| *B64D 17/80* | (2006.01) |
| *B64D 27/24* | (2006.01) |

(52) U.S. Cl.
CPC ................ *B60F 5/02* (2013.01); *B64C 25/36* (2013.01); *B64C 25/62* (2013.01); *B64C 27/20* (2013.01); *B64C 37/00* (2013.01); *B64C 39/02* (2013.01); *B64D 17/80* (2013.01); *B64D 27/24* (2013.01)

(58) Field of Classification Search
CPC .................................. B64C 37/00; B64F 5/02
See application file for complete search history.

(56) References Cited

U.S. PATENT DOCUMENTS

| | | | | |
|---|---|---|---|---|
| 3,096,953 A | * | 7/1963 | Koump ................... | B64C 13/30 |
| | | | | 244/17.19 |
| 10,351,232 B2 | * | 7/2019 | McCullough ........... | B64C 29/02 |

FOREIGN PATENT DOCUMENTS

| | | |
|---|---|---|
| CN | 201447063 U | 5/2010 |
| JP | 2018154332 A | 10/2018 |

(Continued)

*Primary Examiner* — Nicholas McFall
(74) *Attorney, Agent, or Firm* — PARK LAW FIRM

(57) ABSTRACT

The present invention relates to a self-powered drone flying car for land and air, in which a circular riding spherical body (110) that is a commercial space in which a person rides to fly, steer, and control the flying car is formed, a drone wing device (230) that is a flying device is mounted onto the riding spherical body, and a ground driving device for driving on the ground is mounted to a lower portion of the riding spherical body, in order to perform both flying in the air and driving on the ground. Also, an intermediate connection attaching and detaching device (210) is formed between the devices to separate and connect the devices depending on whether the flying device or the ground driving device is necessary.

13 Claims, 22 Drawing Sheets

(56) References Cited

FOREIGN PATENT DOCUMENTS

| JP | 2019-089388 A | 6/2019 |
| KR | 10-2010-0043660 A | 4/2010 |
| KR | 10-2016-0137764 A | 12/2016 |

\* cited by examiner

SELF-POWERED DRONE FLYING CAR FOR LAND AND AIR

CROSS-REFERENCE TO RELATED APPLICATIONS

This U.S. non-provisional patent application claims priority under 35 U.S.C. § 119 of Korean Patent Application No. 10-2019-0157187, filed on Nov. 29, 2019, the entire contents of which are hereby incorporated by reference.

TECHNICAL FIELD

The present invention relates to a self-powered drone flying car for land and air, which is capable of: stopping driving while driving on a ground mad and performing a vertical take-off and landing and flying without attaching gliding wings and without requiring a runway unlike a typical flying car; and separating a drone wing device formed on the flying car to drive on the ground mad by using only a lower ground driving device, thereby having simplicity and convenience of operation.

BACKGROUND ART

Until now, a flying car is used for flight by attaching two long gliding wings to an existing vehicle, and the wings are folded to minimize a driving space while driving on the ground.

However, since the flying car performs a take-off and landing by unfolding the wings to generate a lift force for flight, a long ground runway is inevitably used. Thus, the flying car has a difficulty in commercialization due to the geographical and spatial restrictions.

A flying car of the present invention is formed such that a riding cylindrical body used for a commercial space in which a person rides to steer, transport, and control is formed, and a ground driving device for driving on a ground mad such as a driving wheel having a shape of surrounding an outer portion of the riding cylindrical body and an auxiliary wheel for standing the riding cylindrical body is mounted to each of an outer portion and a lower portion of the riding cylindrical body.

As a flying device is formed on an upper portion of the riding cylindrical body, and an intermediate connection attaching and detaching frame device for connecting the ground driving device mounted to the lower portion of the riding cylindrical body therebetween is formed, the flying device and the ground driving device may be connected to or separated from the riding cylindrical body to form a moving vehicle in a separated and coupled manner, thereby simultaneously or separably performing the ground driving and flying.

DISCLOSURE OF THE INVENTION

Technical Problem

The present invention provides a flying car that simplifies a ground driving device and a flying device, which are two moving and transporting functions, to perform moving in the air and moving on the ground with a person riding therein, forms a structure of effectively coupling and separating structures of the two devices, minimizes and lightens a volume and a weight of each of the devices, secures power energy necessary for movement, maintains a minimum space for a take-off and landing, and secures safety during driving on the ground or flying.

Technical Solution

The present invention provides a flying car that simplifies and effectively arranges, couples, and separates a commercial space in which a person rides to steer, transport, and control, a flying device, and a ground driving device for both flying and driving on a ground road.

To this end, the commercial space is formed in a spherical shape to form a riding spherical body maintaining a minimum space and weight, a drone wing device capable of perform a vertical take-off and landing is mounted on an upper portion of the riding spherical body, four auxiliary wheels and one driving wheel, which are ground driving devices, are respectively mounted to left and right side surfaces and an outer portion of the riding spherical body to secure safety during driving on the ground.

The devices respectively mounted to upper and lower portions based on the riding spherical body are connected by an intermediate connection attaching and detaching frame device to unify as one moving vehicle.

Since the driving wheel mounted in a shape of surrounding the outer portion of the riding spherical body is simplified and unified with one driving system to move while holding the riding spherical body, a driving structure and a transmission system are simplified to minimize and lighten a weight and a volume of the moving vehicle, thereby increasing a driving efficiency.

Also, as the drone wing device formed on the upper portion is separated in case of the ground driving, only the ground driving device may drive on a ground mad for simplicity of the ground mad driving.

A power necessary for movement is obtained by using self-power generation and solar panels, and energy charged in a mounted battery is also used to diversify a source of the power energy.

The self-power generation is performed by using a weight of the car body and a wind power generated by mounting a fan cylinder device using conflicting energy generated in an auxiliary wheel shaft supporting the weight while the flying car drives on the ground mad.

A solar panel 212 is attached to each of a surrounding of a capsule including a parachute and a drone wing protection frame to use solar electric energy.

A large-sized parachute is contained in the capsule and mounted to an upper central portion of the riding spherical body for preparing an emergency situation during flying of the flying car, the capsule is opened in case of emergency to unfold the parachute, thereby allowing a soft landing, and two out of four auxiliary wheel devices are respectively mounted to left and right side surfaces of a lower end of the riding spherical body to secure a standability of the moving vehicle and prevent falling.

Advantageous Effects

The flying car of the present invention exhibits effects as stated below.

First, the flying car is the moving vehicle capable of performing both the driving on the ground and the flying in the air. As the drone wing device that is the flying device is mounted on the upper portion of the riding spherical body having the circular shape, and the auxiliary wheel and the driving wheel that are the ground driving devices are mounted to each of the left and right side surfaces and the outer portion of the riding spherical body in order to increase the transportation efficiency, the unified flying device and grounding driving device may safely drive on the ground, and the drone wind device may be connected to the upper portion of the riding spherical body by the intermediate connection attaching and detaching frame device to perform both the driving on the ground and the flying in the air.

Second, as the circular riding spherical body used for the transportation space is formed to minimize and lighten the volume and the weight of the flying car, the simplified driving spherical body to which one driving wheel is mounted in the shape of surrounding the outer portion of the riding spherical body is mounted so that the driving wheel holds the riding spherical body is formed, and the volume and the weight of the car body are minimized and lightened, so that the flying car may perform the vertical take-off and landing by using the five drone wings formed on the upper portion of the riding spherical body.

Third, as the drone wing and the parachute capsule device formed on the upper portion of the flying car are separated in case of the ground driving, only the ground driving device may drive on the mad to simplify the driving on the ground mad.

Fourth, the power energy may be obtained by itself by mounting the solar panel and the self-power generation system to the flying car, and the electricity charged by the mounted battery may be simultaneously used to diversify the source of the power energy.

Fifth, as the capsule including the large-sized parachute therein is mounted to the upper portion of the flying car, the parachute may be unfolded in case of emergency to perform the soft landing.

MODE FOR CARRYING OUT THE INVENTION

A flying car of the present invention will be described with reference to the accompanying drawings.

Figure 1:
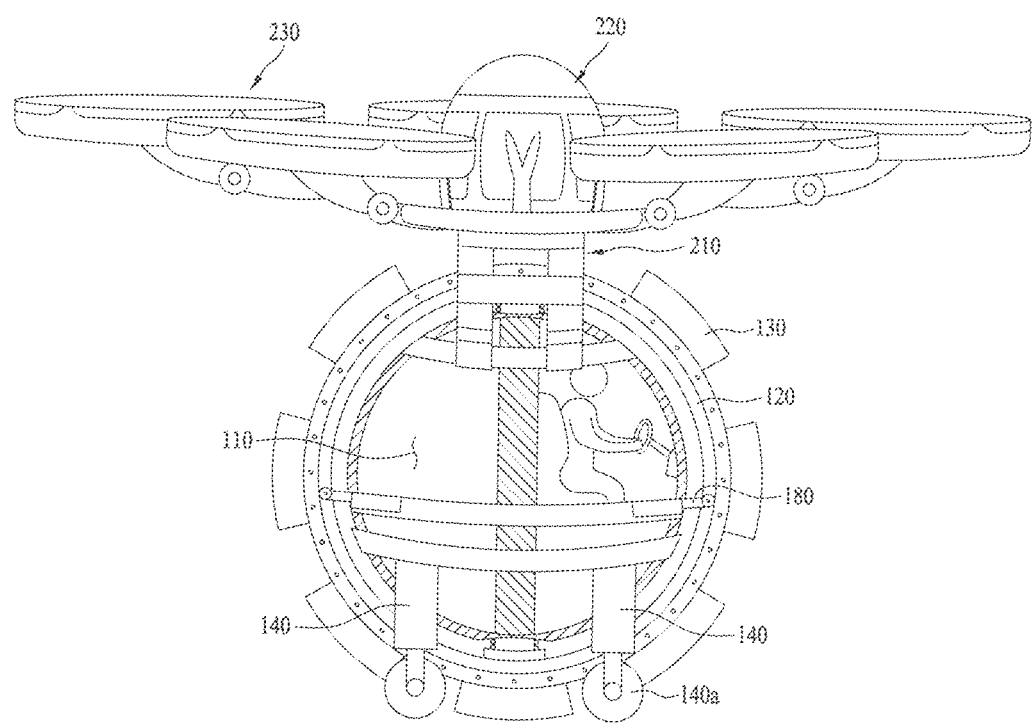
FIG. 1 is a side view illustrating a flying car according to the present invention.

FIG. 1 is a representative drawing of the flying car of the present invention, in which one driving wheel 130 that is a ground driving device is mounted to surround an outer portion of a riding spherical body 110 having a circular sphere shape.

Two auxiliary wheels 140*a* that are ground driving devices for safely standing and moving the riding spherical body are mounted to a lower portion of each of left and right surfaces of the riding spherical body 110 having the circular shape and used as a commercial space in which a person rides to steer, drive, and transport the flying car, an auxiliary wheel shock absorber frame device 140 and a fan cylinder device 150 are connected to an upper portion of an auxiliary wheel shaft 140*g*, and a drone wing device 230 and a parachute capsule device 220 including a parachute therein are connected to an upper portion of the riding spherical body 110 by an intermediate connection attaching and detaching frame device 210.

As the intermediate connection attaching and detaching frame device 210 that detachably connects the riding spherical body 110 to which the ground driving device is mounted with the drone wing device 230 and the parachute capsule device 220 is provided therebetween, the flying device and the ground driving device may be separated from or integrated with each other.

Figure 2:
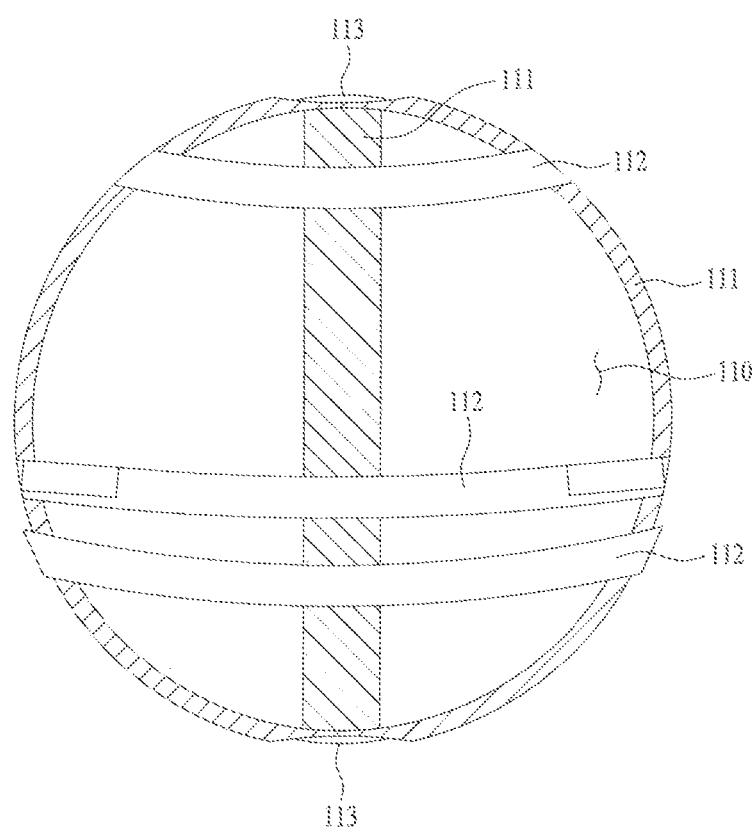
FIG. 2 is a side view illustrating a riding cylindrical body 110 according to the present invention.

FIG. 2 is a view illustrating the riding spherical body 110 having the circular shape used as the commercial space in which a person rides to steer, drive, and transport the flying car.

As a cylindrical shock absorber frame mounting groove 113 to which a shock absorber frame device 160 and 162 is inserted is defined at each of upper and lower vertices of the riding spherical body, each of the shock absorber frames is mounted to the shock absorber frame mounting groove 113 to absorb and damp a shock during movement.

A vertical safety frame 111 surrounding a surface of the spherical body with a cross shape in four vertical directions is formed from the upper vertex to the lower vertex of the riding spherical body 110 in order to protect the spherical body and easily attach all sorts of member devices thereto, one horizontal safety frame 112 spaced a predetermined distance from the upper vertex of the riding spherical body 110 and horizontally surrounding the riding spherical body 110 is formed, and the intermediate connection attaching and detaching frame device 210 is connected to the horizontal safety frame.

As two horizontal safety frames 112 spaced a predetermined distance from the lower vertex of the riding spherical body and horizontally surrounding the riding spherical body are additionally formed, a direction conversion device 180 and a driving gear device 190 are attached and connected to the frames.

Figure 3:
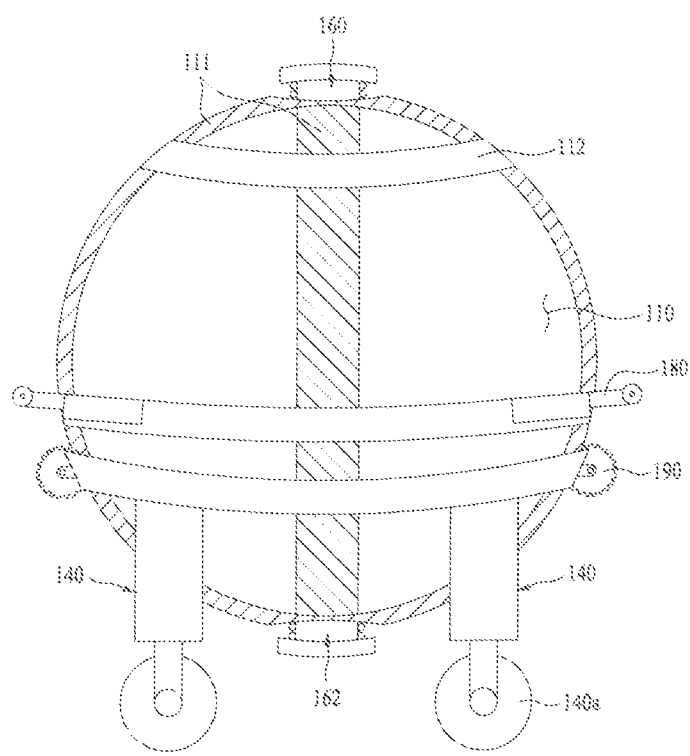
FIG. 3 is a side view illustrating the riding cylindrical body 110 to which each of an auxiliary wheel device 140, a direction conversion device 180, and a driving gear device 190 is mounted according to the present invention.

In FIG. 3, the upper and lower shock absorber frame devices 160 and 162 are respectively formed in the shock absorber frame mounting grooves 113 respectively defined in the upper and lower vertices of the riding spherical body 110 in FIG. 2, and the rotation load wheel frame direction conversion device 180 and the driving gear device 190 are respectively mounted to front and rear portions of the riding spherical body 110.

The two auxiliary wheels 140*a* are respectively attached to left and right lower portions of the riding spherical body 110, and the fan cylinder device 150 and the auxiliary wheel shock absorber frame device 140 for damping a shock are attached above the auxiliary wheel shaft.

Figure 4:
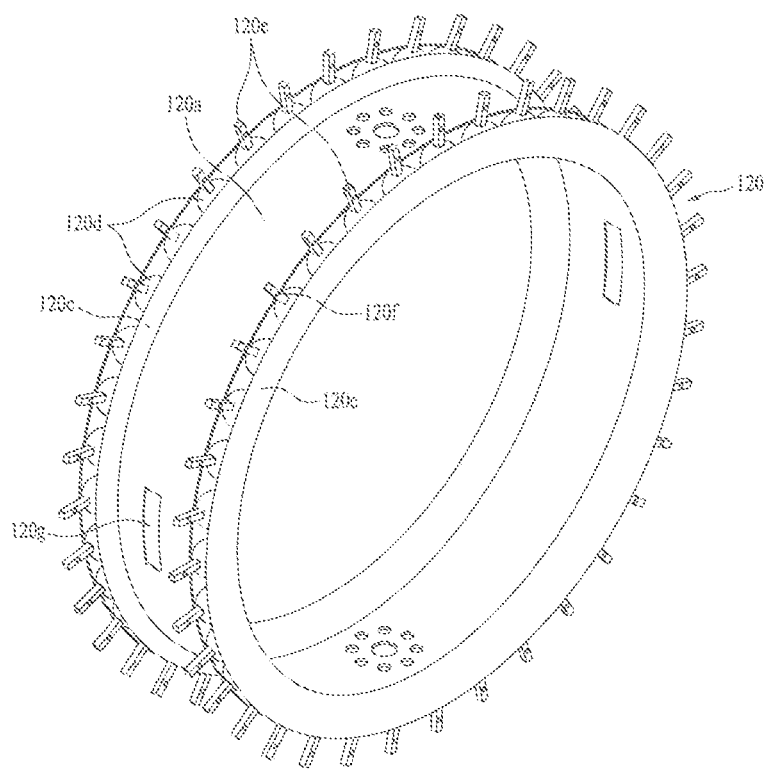
FIG. 4 is a side view illustrating a rotation load wheel frame 120 according to the present invention.

FIG. 4 is a side view illustrating a rotation load wheel frame 120 for providing a rotation load to the driving wheel 130 so that the driving wheel 130 is safely rotated instead of being separated or deviated.

Fixing wheel frames 120*c* each having a circular shape with the same diameter are respectively fixed to both ends of a frame 120*a* of the rotation load wheel frame 120.

As the fixing wheel frames 120*c* respectively fixed to both ends of the frame 120*a* as described above each have a predetermined upper portion formed in an opened shape along a wheel direction, an entire moving wheel frame is inserted into the fixing wheel frame through the opening portion, ball beatings are formed along the rounded inside of the moving wheel frame inserted into the fixing wheel frame, lower portions of the ball beatings formed on the inside is exposed as a predetermined portion of a bottom surface of the wheel frame including the ball bearings therein is opened, and a friction force is minimized as the exposed portion is connected to an inner bottom surface of the fixing wheel frame. Thus, the moving wheel frame may be easily rotated while being inserted into the fixing wheel frame.

As a fixing member connected with the driving wheel is consecutively formed on an upper portion of the moving wheel frame along the wheel, the driving wheel is connected with the moving wheel frame to be rotated together.

As a moving wheel frame 120*d* is rotated while surrounding the fixing wheel frame 120*c* as described above, the moving wheel frame 120*d* provides a rotation load function to the rotation load wheel frame 120. The above-described rotation load function of the rotation load wheel frame 120 rotates the connected driving wheel 130.

As a connection member 120*e* protruding to be easily connected with the driving wheel 130 is formed on the upper portion of the moving wheel frame 120*d*, and each of connection holes 120*f* spaced a predetermined distance from each other is formed in the connection member 120*e*, the connection holes 120*f* are connected to connection holes 130*c* spaced the same distance as the connection holes 120*f* and formed in a connection member 130*b* formed in a frame 130*a* of the driving wheel 130, and the coupled driving wheel 130 is smoothly rotated instead of being deviated or separated.

Figure 5:
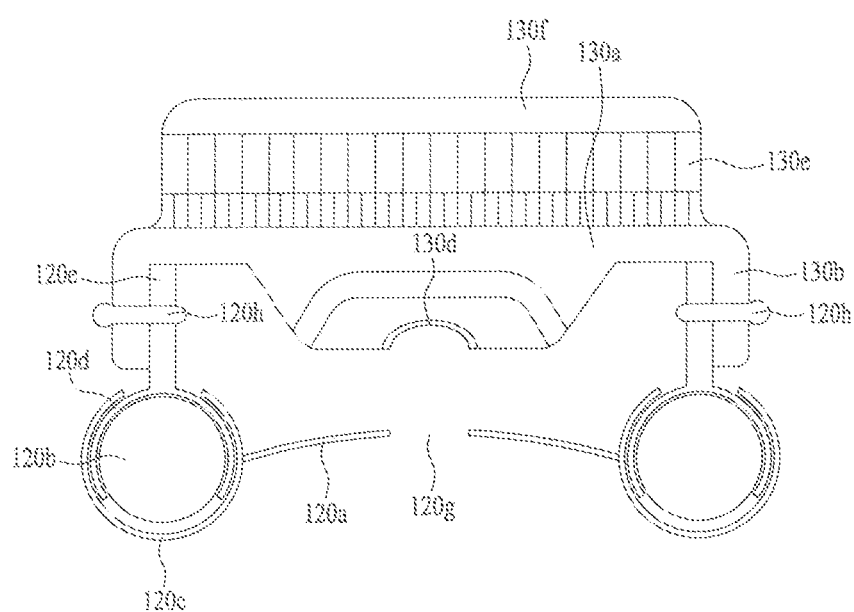
FIG. 5 is a cross-sectional view illustrating the rotation load wheel frame 120 coupled with a driving wheel 130 according to the present invention.

FIG. 5 is a cross-sectional view obtained by cutting the rotation load wheel frame 120 connected with the driving wheel 130 in a horizontal direction, in which each of the frame 120*a* of the rotation load wheel frame 120 and the moving wheel frames 120*d* respectively attached to the both ends of the frame 120*a* is fixed.

The fixing wheel frame 120*c* is coupled with the moving wheel frame 120*d* while surround the moving wheel frame 120*d* and fixed to the both ends of the frame 120*a* of the rotation load wheel frame 120 to serve as a base for rotating the moving wheel frame 120*d*.

The connection member 120*e* protruding to be easily connected with the driving wheel 130 is formed on an upper end of the moving wheel frame 120*d*, and a portion expressed by a dotted line in the connection member is the connection hole 120*f*.

Figure 6:
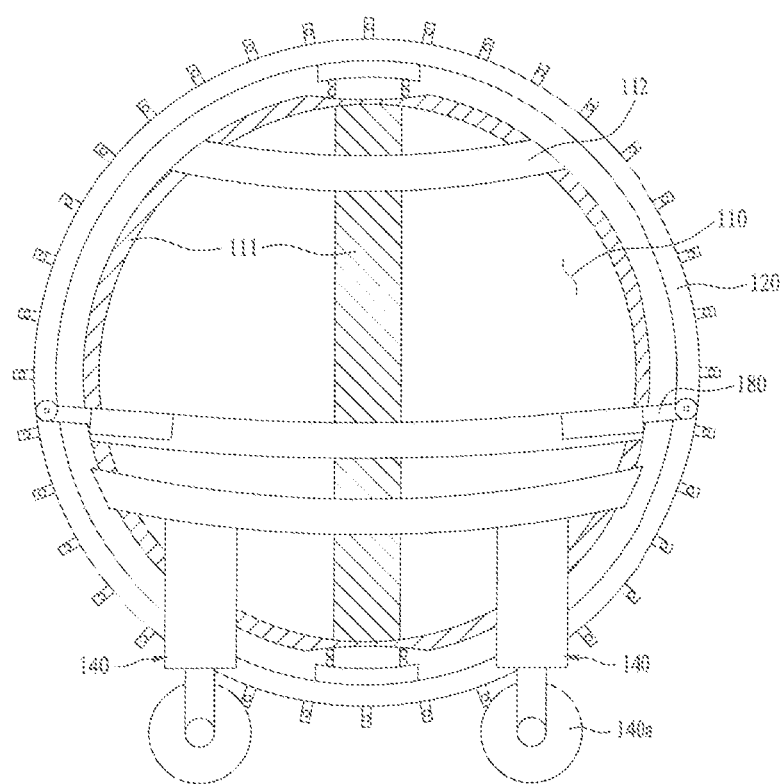
FIG. 6 is a side view illustrating the riding cylindrical body 110 to which the auxiliary wheel device 140, the direction conversion device 180, the driving gear device 190, and the rotation load wheel frame 120 are mounted according to the present invention.

FIG. 6 is a view illustrating a shape in which the rotation load wheel frame 120 is connected to the shock absorber frame device mounted to each of the upper and lower vertices of the riding spherical body 110, and a protruding portion at an outer portion of the rotation load wheel frame 120 is the connection member 120*e* for connecting the driving wheel 130.

In the drawing, the direction conversion device 180 and the driving gear device 190 of the rotation load wheel frame, which are respectively mounted to front and rear portions of the riding spherical body 110, are connected to the rotation load wheel frame 120 and provide a direction conversion and a power.

Ends of the upper and lower shock absorber frame devices 160 and 162 respectively mounted to the upper and lower vertices of the riding spherical body are connected and attached thereto, and the connected portion is connected to a structure having a rotation function so that the rotation load wheel frame 120 is converted into left and right directions. Here, the direction conversion is powered by pushing and pulling of two hydraulic cylinders 180*a* of the direction conversion device 180.

Figure 7:
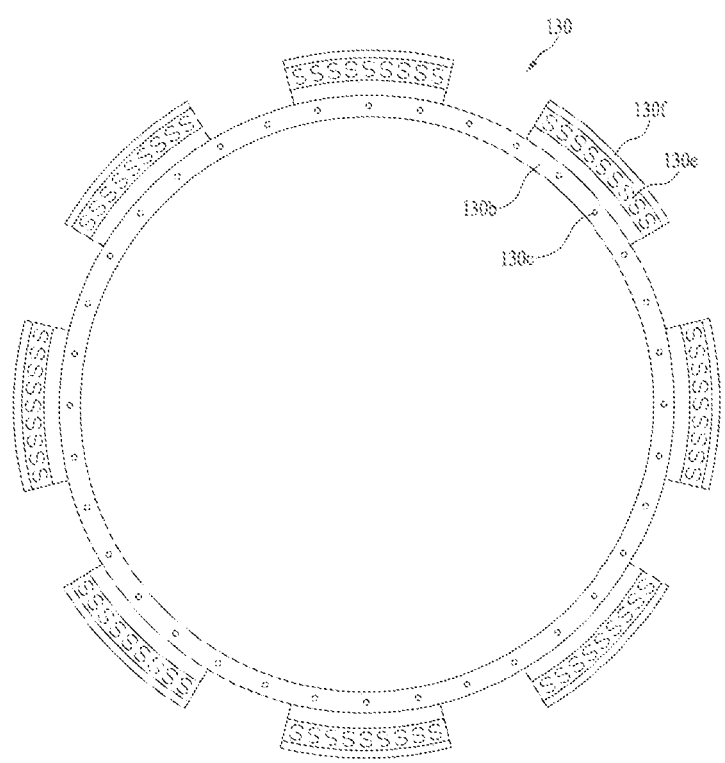
FIG. 7 is a plan view illustrating the driving wheel 130 according to the present invention.

FIG. 7 is a side view of the driving wheel 130. The driving wheel 130 is connected to the rotation load wheel frame 120 to receive a rotation load, and connected to the driving gear device 190 to receive an electric power, thereby being rotated.

As the connection member 130*b* for connecting and fixing the frame 130*a* of the driving wheel 130 to the rotation load wheel frame 120 is formed along the rounded inside of the frame 130*a*, and the connection holes 130*c* spaced a predetermined distance from each other are formed in the connection member 130b with the same size and distance as the connection holes 120f of the moving wheel frame connected to the rotation load wheel frame 120, the above-described connection holes are coupled and fixed by a connection unit such as a bolt, and the driving wheel 130 is rotated together with the moving wheel frame mounted to the rotation load wheel frame 120.

The driving wheel 130 provides a driving force. However, the driving wheel 130 is rotated by receiving a driving force from the driving gear device 190 instead of generating the driving force by the wheel itself.

Figure 8:
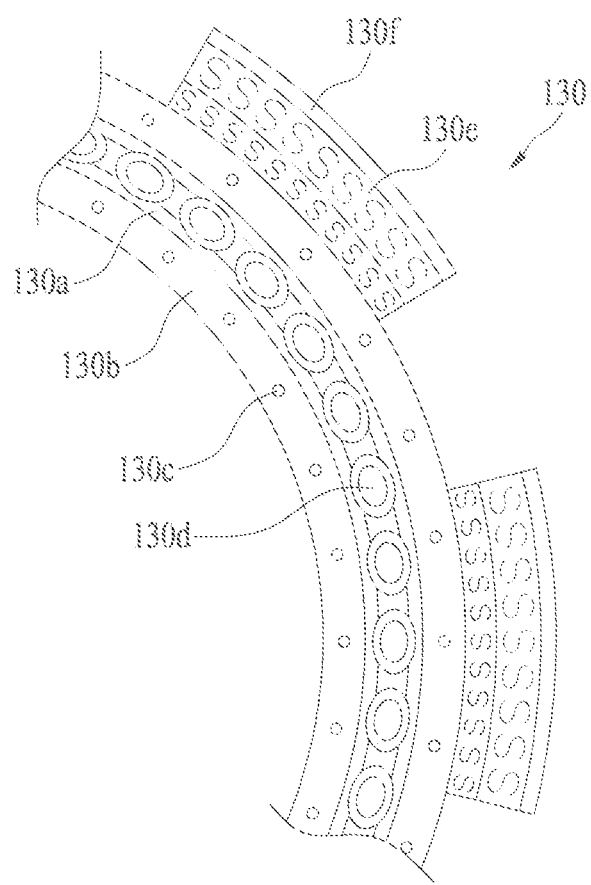
FIG. 8 is a partial internal view illustrating the driving wheel 130 in which a driving chain is formed on a frame 130*a* according to the present invention.

Thus, the driving wheel 130 requires the driving gear device 190 and the connection unit. As illustrated in FIG. 8, an electric power is easily transmitted from the driving gear device 190 to the driving wheel 130 as a driving chain 130d is formed on an inner surface of the frame 130a of the driving wheel 130 and connected with the driving gear 190a of the driving gear device 190.

Here, when the driving gear 190a is connected to the driving wheel 130, the frame 120d of the rotation load wheel frame 120 may be interrupted. Thus, a driving gear hole 120g that is opened with a size enough to be connected with the sufficiently protruding driving gear 190a is formed in the frame 120a of the interrupted portion.

The driving wheel 130 includes a wheel frame 130a maintaining a circular wheel shape, a damping frame 130e for absorbing a shock when moving, and a tire 130f contacting the ground. The tire is made of a synthetic material such as rubber capable of primarily absorbing a shock when contacting the ground, and the damping frame includes a plurality of frames each having a thin "S"-shape and maintaining elasticity, which are connected by a connection pin to absorb a shock.

In the driving wheel 130, only the damping frame 130e and the tire 130f may be cut by a predetermined gap to lighten a weight of the wheel within a range capable of maintaining a rotation force of the driving wheel.

FIG. 8 is a view illustrating the driving chain 130d formed inside the wheel frame 130a of the driving wheel 130 as a unit for receiving a power from the driving gear device 190.

Figure 9:
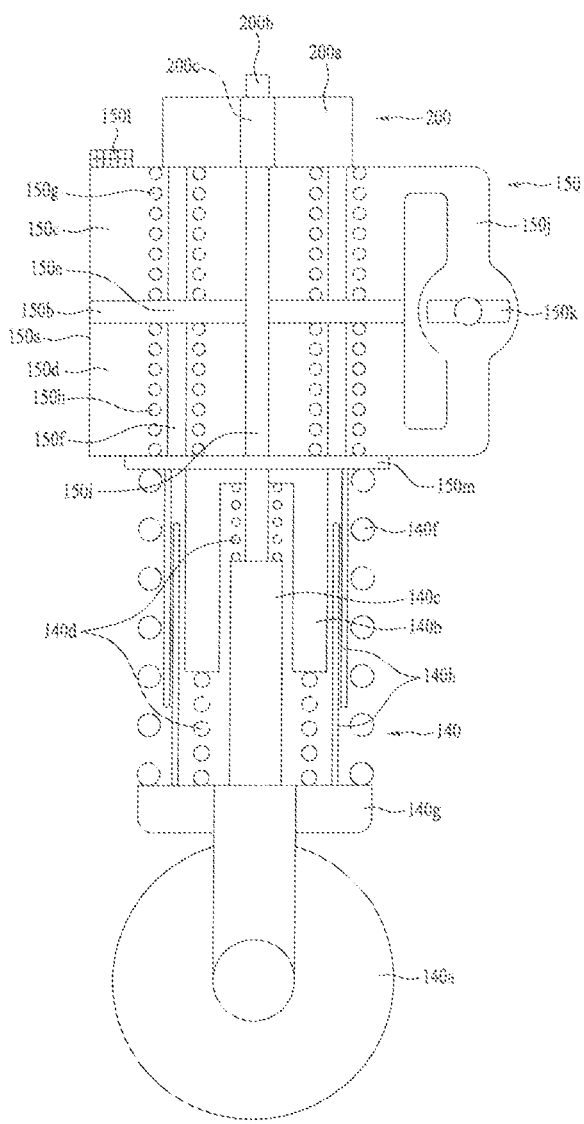
FIG. 9 is an internal view illustrating a fan cylinder device 150 coupled with the auxiliary wheel device 140 and a self-power generator 200 according to the present invention.

FIG. 9 is an internal view illustrating the auxiliary wheel shock absorber frame device 140 formed by coupling the auxiliary wheels 140a and the shock absorber frame, which are mounted to the lower ends of the left and right surfaces of the riding spherical body 110, and the fan cylinder device 150 connected and fixed onto the auxiliary wheel shock absorber frame device 140. A self-power generator 200 that generates a power by a movement force of a fan membrane moving pole 150i is mounted onto the fan cylinder device 150.

The auxiliary wheels 140a is attached for the purpose of safely standing and moving the riding spherical body 110 during driving instead of being self-powered. The riding spherical body stands and is safely moved while maintaining a horizontal state during driving by the auxiliary wheels 140a.

The auxiliary wheels 140a is connected to the shock absorber frame device 140 absorbing a shock during driving, and the fan cylinder device 150 compressing air to generate a wind power is formed on the The fan cylinder device 150 is fixed and attached to the riding spherical body 110, and the auxiliary wheel shock absorber frame device connected onto the auxiliary wheel shaft absorbs the shock generated during driving.

The auxiliary wheel shock absorber frame device 140 is formed as male and female frames are coupled, a spring is attached to the coupled portion to absorb a shock, and an outer spring 140f surrounding the male and female frames is additionally attached to an outer portion of the male and female frames in a state in which the male and female frames 140b and 140c are coupled to increase a shock absorption capacity and a damping force thereof.

Although the male and female frames 140b and 140c formed on the auxiliary wheel shock absorber frame device are coupled to each other, as energy directions thereof generated during driving are differently formed, the female frame and the male frame are fixed and attached to the fan cylinder and the auxiliary wheel shaft, respectively.

The outer spring 140f surrounding the male and female frames 140b and 140c has an upper end fixed and attached to a lower end of the fan cylinder and a lower end attached to the auxiliary wheel shaft 140g to absorb a shock of the auxiliary wheel and simultaneously prevent the auxiliary wheels 140a from being separated or deviated.

The fan cylinder device 150 includes: a cylindrical fan cylinder 150a; a fan membrane 150b formed inside the fan cylinder; two fan membrane load poles 150f respectively fixed and attached with a predetermined gap to inner top and bottom surfaces of the fan cylinder 150a in order to move the fan membrane in a vertical direction without being separated and deviated; a fan membrane load hole 150e defined at each of left and right side of the two fan membrane load poles 150f to pass therethrough; and a fan membrane 150b blocking an inner central portion of the fan cylinder 150a in a horizontal direction and vertically moved to generate a wind power in the fan cylinder 150a. Here, the fan cylinder 150a is divided into a first fan chamber 150c that is an upper portion and a second fan chamber 150d that is a lower portion based on the fan membrane 150b.

Four fan chamber springs providing a restoration force to be restored to an original position after moved are attached to the fan membrane. As two springs out of the fourth springs surround the fan membrane load pole 150f formed in the first fan chamber 150c, and the rest two springs surround the fan membrane load pole 150f formed in the second fan chamber 150d, each of the springs has one end and the other end that are respectively fixed and attached to the top and bottom surfaces of the fan membrane 150b and the inner top and bottom surfaces of the fan cylinder 150a.

An air moving pipe 150j connecting the first fan chamber 150c and the second fan chamber 150d so that air is moved therethrough is formed at one side of the outside of the fan cylinder 150a, and an air rotation plate 150k is mounted to a middle portion of the inside of the air moving pipe 150j.

The fan membrane moving pole 150i fixed and attached to a central portion of the fan membrane 150b is formed elongated downward to pass downward through a central portion of a bottom surface of the fan cylinder 150a, a central portion of the auxiliary wheel shock absorber frame device, and a central portion of the female frame and the male frame 140c and then fixed and attached to the auxiliary wheel shaft 140g.

As a load generated from a car body during driving and a repulsive force resistant to the load is generated in the auxiliary wheel shaft 140g, the fan membrane moving pole 150i fixed and attached to the auxiliary wheel shaft is moved in the vertical direction.

The fan membrane moving pole 150i moved in the vertical direction as described above moves the fan membrane 150b in the vertical direction in the fan cylinder 150a, thereby generating a wind power in the fan cylinder 150a, and the wind power generated in the fan cylinder 150a passes through the air moving pipe 150j connecting the rust fan chamber 150c and the second fan chamber 150d.

An air rotation plate rotating in one direction along movement of the air is mounted to the inside of the middle portion of the air moving pipe 150*j*. The portion to which the air rotation plate is mounted in the air moving pipe 150*j* has an extended pipe diameter greater than a diameter of the air rotation plate.

As a rotation gear pole 170*a* has one end fixed and attached to a central shaft of the air rotation plate 150*k* rotating as described above and the other end fixed and attached to the air rotation plate 150*k* having the same shape as the fan cylinder device 150 disposed at an opposite side of the riding spherical body, the rotation gear pole 170*a* rotates by a moving wind power.

A rotation gear 170*b* is fixed and attached to a middle portion of the rotation gear pole 170*a*.

The rotation gear 170*b* is connected to an acceleration gear 170*c*, and the acceleration gear 170*c* is connected to a power generation device 170*e* to drive the power generation device, thereby generating a power.

Here, since an air pressure in the fan cylinder 150*a* increases when the wind power is generated as the fan membrane 150*b* formed in the fan cylinder 150*a* is moved in the vertical direction by the fan membrane moving pole 150*i*, air is necessary to be discharged when the air pressure in the fan cylinder 150*a* exceeds a predetermined pressure. Thus, the air exceeding the predetermined pressure is discharged by forming a compressed air discharge hole 150*l* at one side of an upper end of the fan cylinder.

A connection member 140*h* is formed at an end at which the fan membrane moving pole is connected to the auxiliary wheel shaft and connected to the auxiliary wheel shaft. After connected as described above, the connection member has own rotation function so as not to disturb the auxiliary wheel when the auxiliary wheel rotates in left and right directions.

Figure 10:
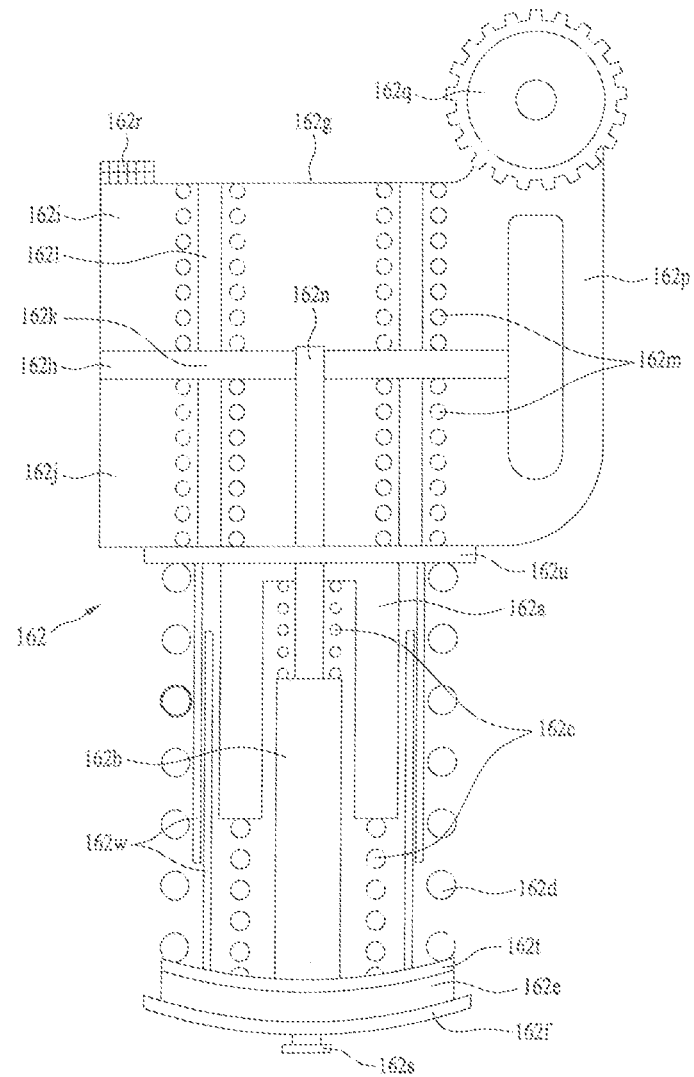
FIG. 10 is an internal view illustrating a shock absorber frame 162 and a fan cylinder device 162 mounted to a lower vertex of the riding cylindrical body 110 according to the present invention.

FIG. 10 is an internal view illustrating the shock absorber frame mounted to the lower vertex of the riding spherical body and the fan cylinder shock absorber frame device 162 connected with the fan cylinder attached to an upper end of the shock absorber frame. As illustrated in FIG. 9, the fan cylinder shock absorber frame device 162 have the same structure and function of the fan cylinder device as the shock absorber frame device mounted to the auxiliary wheel shaft. However, a rotation gear protruding highly to the outside of the air moving pipe and having a saw-tooth shape is formed thereto instead of the air rotation plate formed inside the air moving pipe. The rotation gear 162*g* is connected to the acceleration gear 170*c*.

Figure 11:
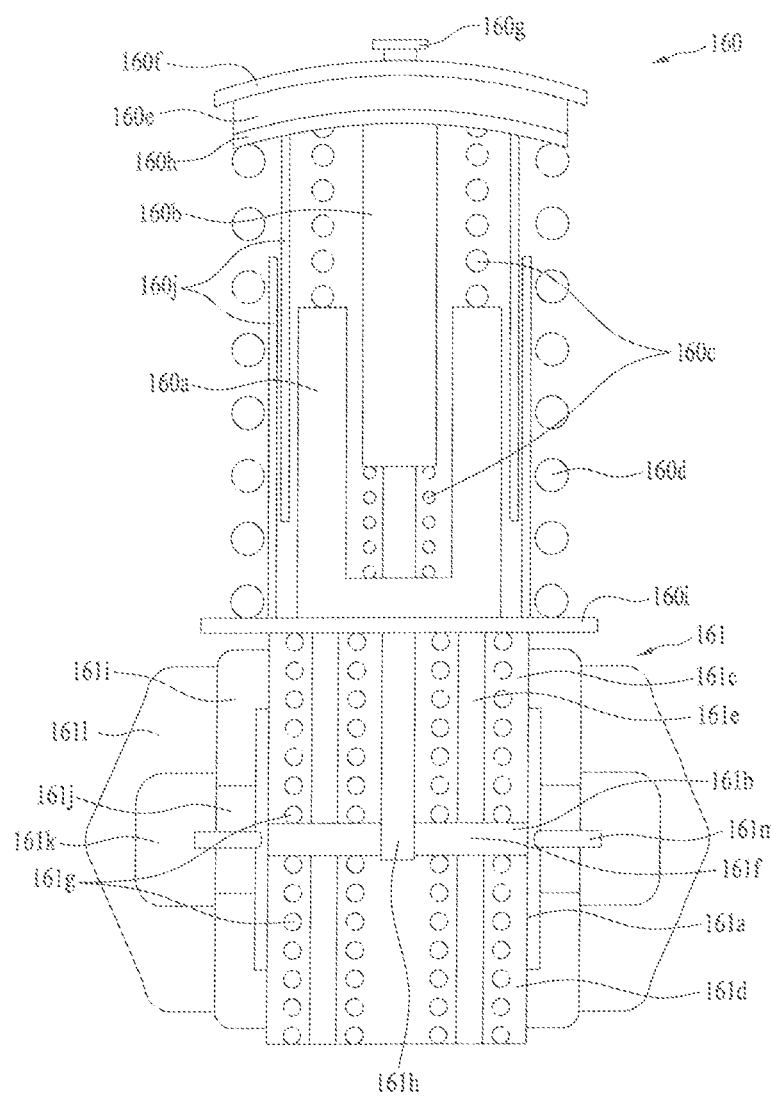
FIG. 11 is an internal view illustrating a shock absorber frame 160 mounted to an upper vertex of the riding cylindrical body 110 and a self-power generator 161 using one fan cylinder according to the present invention.

FIG. 11 is an internal view illustrating the shock absorber frame device 160 and a self-power generator 161 formed by one fan cylinder connected to a lower end of the shock absorber frame device 160.

The self-power generator moves the air in the fan cylinder to generate electricity by using energy conflicting the load generated from the riding cylindrical body and the driving wheel 130 supporting and moving the riding cylindrical body.

The fan cylinder device formed on the self-power generator has the same structure and function of the fan cylinder device connected to the auxiliary wheel shock absorber frame device, but is different in that one air moving plate is formed at each of the left and right sides, and the self-power is performed by using a rotation force of two air rotation plates formed in two air moving pipes.

The present invention provides three kinds of self-power generators including a self-power generator by using the wind power generated from one fan cylinder connected to each of wheel shafts, a self-power generator connecting wind powers generated from five fan cylinders, and a self-power generator by using a vertical movement force of the fan membrane mounted in the fan cylinder.

Hereinafter, a power generation process, configuration, and function of three kinds of self-power generators 200 including self-power generators 161 and 170 using one and five fan cylinders and a self-power generator using the vertical movement force of the fan membrane mounted in the fan cylinder will be described.

As illustrated in FIG. 11, the fist-type self-power generator 161 using one fan cylinder obtains a power generated by the fan cylinder 161*a* attached to a bottom surface of the upper shock absorber frame device 160 inserted and mounted to the shock absorber frame mounting groove 113 formed in the upper end of the riding spherical body. The fan cylinder 161*a* has a cylindrical shape, and a fan membrane 161*b* is formed at a central portion of the cylindrical shape in the horizontal direction. The fan cylinder 161*a* is divided into a rust fan chamber above the fan membrane and a second fan chamber 161*d* below the fan membrane.

A fan membrane load hole 161*f* passes through the fan membrane so that two fan membrane load poles 161*e* are moved in the vertical direction at a normal position instead of being separated or deviated in the fan cylinder, and four springs surrounding the fan membrane load poles are formed so that the fan membrane is restored to an original position after the fan membrane is moved.

The self-power generator 161 using one fan cylinder uses conflicting energy having two energy axes acting in opposite directions.

The upper shock absorber frame device 160 of the riding spherical body is inserted to the shock absorber frame mounting groove 113 defined at the upper portion of the riding spherical body, and the self-power generator 161 using one fan cylinder is attached to the lower portion of the upper shock absorber frame device 160 of the riding spherical body.

The male frame 160*b* disposed at an inner upper side of the upper shock absorber frame device 160 of the riding spherical body is fixed to a bottom surface of a bearing wheel mounting circular plate 160*h*, and a cylindrical protection blocking membrane 160*j* surrounding the male frame to protect the male frame and the spring disposed therein is fixed to a bottom surface of the bearing wheel mounting circular plate 160*h*, the connected driving wheel 130 and a bearing wheel 160*e* converting a direction into the left and right directions when the rotation load wheel frame is operated are attached to a top surface of the bearing wheel mounting circular plate 160*h*, the bearing wheel 160*e* is connected to the inside of the upper vertex of the rotation load wheel frame 120 connected with the driving wheel by a bearing wheel fixing member 160*f* to form one energy axis, the male frame 160*b*, the bearing wheel mounting circular plate 160*h*, the circular protection blocking membrane 160*j*, and the bearing wheel 160*e* are connected and attached to the rotation load wheel frame connected with the driving wheel to operate together with the integrated rotation load wheel frame 120, the female frame 160*a* formed on the inner lower side of the upper shock absorber frame device 160 of the riding cylindrical body is fixed to a top surface of a fan cylinder mounting circular plate 160*i*, a cylindrical protection blocking membrane surrounding the female frame 160*a* to protect the female frame and a spring disposed therein, which has a diameter greater than that of the circular protection blocking membrane 160*j* and occlusively crosses the same due to different fixing directions, is fixed to a top surface of the fan cylinder mounting circular plate 160*i*, a fan cylinder 161a including the power generator is fixed to a bottom surface of the fan cylinder mounting circular plate 160i to form another energy axis, and the female frame 160a, the fan cylinder mounting circular plate 160i, the cylindrical protection blocking membrane 160j, and the fan cylinder 161a are fixed and attached to the riding cylindrical body 110 to operate together with the riding cylindrical body.

The two energy axes formed as described above is connected to one end of the fan membrane 161b formed in the fan cylinder 161a, and the other end of the fan membrane 161b, which passes through the fan cylinder mounting circular plate 160i, the female frame 160a, the male frame 160b, and the bearing wheel mounting circular plate 160h is connected by a fan membrane moving pole 161h fixed to the inside of the upper vertex of the rotation load wheel frame 120 to which the driving wheel 130 is attached by a fan membrane moving pole fixing member 160g, and the load applied to the car body during driving by the spring formed between the female frame 160a and the male frame 160b formed on the upper shock absorber frame device 160 of the riding cylindrical body and the conflicting energy absorbing and repelling the load are consecutively generated in the vertical direction.

The conflicting energy generated in the vertical direction as described above is transmitted to the fan membrane moving pole 161h connected to the fan membrane 161b formed in the fan cylinder to move the fan membrane in the vertical direction, thereby generating wind power energy that is a source of power generation.

The energy generation axis generated in one direction as described above is connected to potential energy generated in the opposite direction by the fan membrane moving pole 161h.

As the one end of the fan membrane moving pole 161h is connected to the inner upper vertex of the rotation load wheel frame 120 to which the driving wheel 130 that is a starting point of the energy axis generated in one direction by a fan membrane moving pole fixing member 160g, the fan membrane moving pole 161h passes through the male frame 160b and the female frame 160a, and the other end is connected to the fan membrane 161b mounted in the fan cylinder through the fan cylinder mounting circular plate 160i, energies acting in different directions during driving is absorbed, repelled, and restored by the male and female frames 160a and 160b and a spring 160c formed between the male and female frames to move the connected fan membrane moving pole in the vertical direction, the fan membrane moving pole moves the fan membrane so that the fan membrane generate a wind power, the wind power is moved between the first fan chamber 161c and the second fan chamber 161d through the air moving pipe to rotate the air rotation plate 160j mounted in the air moving pipe 161i, and the air rotation plate rotates a power generation wheel 161k connected to one end of a rotation shaft of the rotation plate to generate electricity.

Although the second-type self-power generator 170 using five fan cylinders has a partially different structure from the self-power generator 161 using one fan cylinder as illustrated in FIGS. 9 and 10, the self-power generator 170 has the same structure and function of generating a power by a wind power in that the axes moving in different directions uses conflicting energy as a power source, the mounted fan cylinder has the same structure, and a power is generated by generating wind in the fan cylinder and using the wind power.

The self-power generator 170 using five fan cylinders receives a power by the four auxiliary wheel shaft 140g connected with the auxiliary wheels 140a, the four auxiliary wheel shock absorber frame devices 140 connected to the auxiliary wheel shafts, and four fan cylinder devices 150 connected onto the auxiliary wheel shock absorber frame devices.

However, the self-power generator 170 receives a power by five fan cylinders by adding the lower shock absorber frame device of the riding cylindrical body inserted and mounted to the shock absorber frame mounting groove 113 of the riding cylindrical body defined in the lower end of the riding cylindrical body and the fan cylinder device formed on the fan cylinder device 162.

The four fan cylinder devices 150 connected onto the auxiliary wheel shock absorber frame device 140 formed above the auxiliary wheel shaft form two pairs in accordance with positions of the auxiliary wheels as a reference of the power, and one fan cylinder device 162 receives a power from the rotation load wheel frame 120 having a central point at a center of the four auxiliary wheels and connected with the driving wheel.

In the self-power generator 170 using five fan cylinders, the air moving pipe is formed only at one side of the fan cylinder device. Four fan cylinder devices out of the five fan cylinder devices form two pairs in accordance with the positions of the auxiliary wheels.

Figure 12:
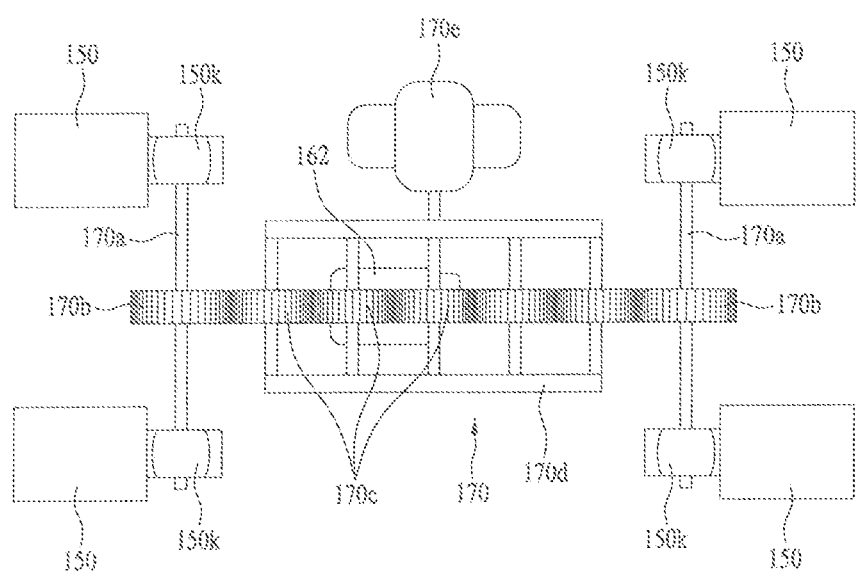
FIG. 12 is a plan view illustrating a self-power generator 170 using five fan cylinders mounted inside the riding cylindrical body 110 according to the present invention.

As illustrated in FIG. 12, as one end of the rotation gear pole 170a is fixed to a central axis of the air rotation plate 150k formed inside the air moving pipe 150j of the fan cylinder devices forming one pair, and the other end of the air rotation plate of each of the fan cylinder devices forming the other pair, the rotation gear pole rotates by movement of the wind power generated from the fan cylinder, the acceleration gear rotates as the rotation gear is mounted to a central point of the rotation gear pole and connected with the acceleration gear, and the acceleration gear operates the power generator connected thereto.

The third-type self-power generator 200 uses moving energy repeatedly moving in the vertical direction while the fan membrane mounted in the fan cylinder is operated as a power instead of using the wind power energy generated from the fan cylinder as a power unlike the rust and second-type self-power generators 161 and 170.

Although the rust and second-type self-power generators 161 and 170 receive the power by extending and connecting the fan membrane moving pole 150i and 161h fixed to the bottom surface of the fan membrane mounted in the fan cylinder until the wheel shaft, the third-type self-power generator 200 uses the power moving in a direction of a vertical movement of the fan membrane moving pole and a rack gear by extending the fan membrane moving pole until the top surface of the fan membrane to be exposed outside the fan cylinder and attaching a rack gear 200i to both sides of a exposed fan membrane extension moving pole 200b.

Figure 13:
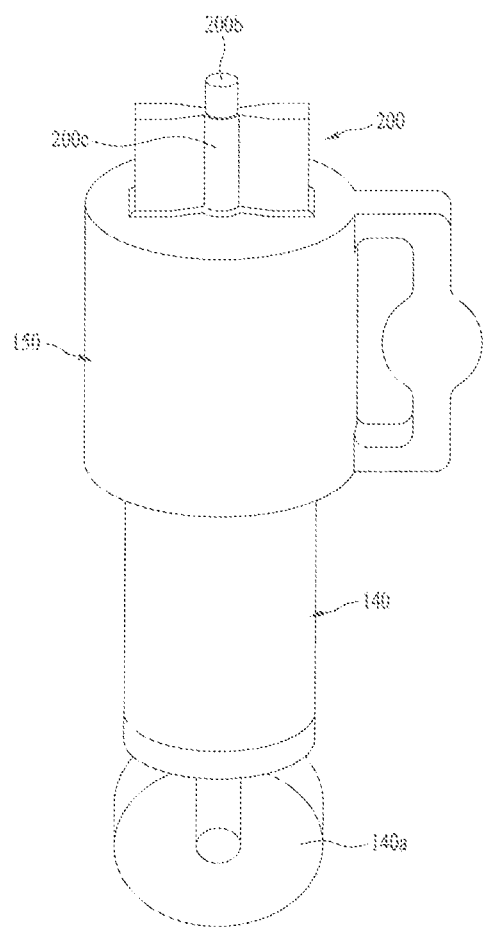
FIG. 13 is a side view illustrating the self-power generator 200 using a movement force of the fan membrane and mounted on the fan cylinder device according to the present invention.
Figure 14:
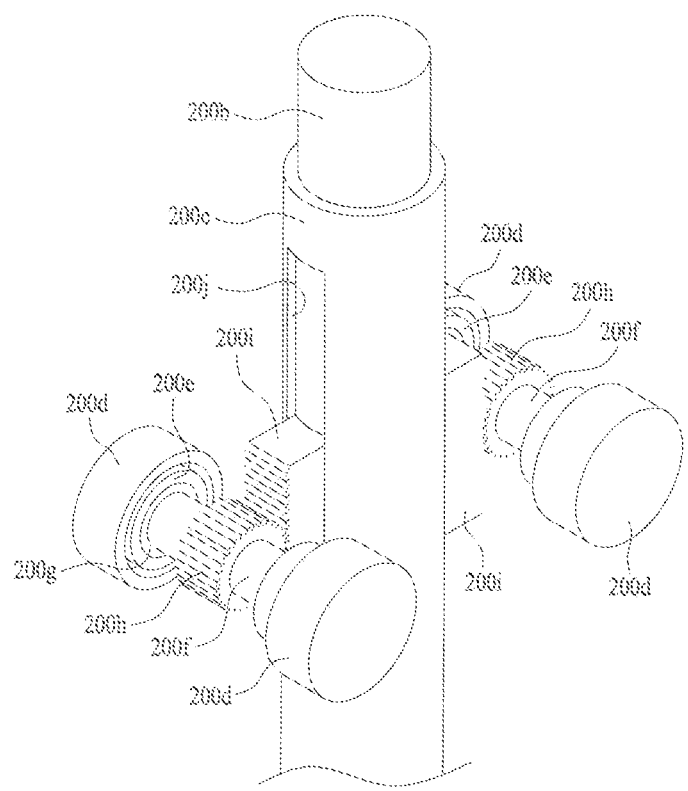
FIG. 14 is an internal view illustrating the self-power generator 200 using the movement force of the fan membrane according to the present invention.
Figure 15:
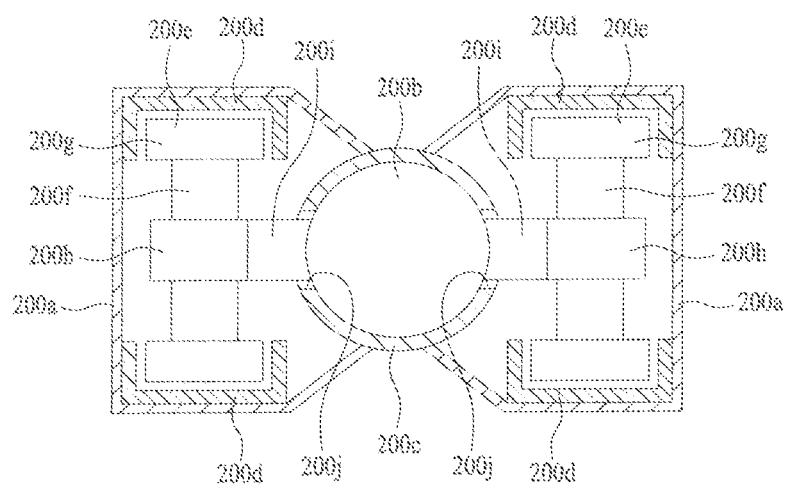
FIG. 15 is a plan view illustrating the self-power generator 200 using the movement force of the fan membrane according to the present invention.

As illustrated in FIGS. 13, 14, and 15, the third-type self-power generator 200 generating the power by the vertical movement force of the fan membrane mounted in the fan cylinder forms a fan membrane extension moving pole moving hole 200c providing a load moving in the vertical direction, fixing two stator bodies 200a in which rotators are mounted to both sides thereof to both sides of the fan membrane extension moving pole moving hole 200c in a state in which the fan membrane extension moving pole moving hole 200c is formed therebetween to be integrated with each other, and fixing the integrated stator body 200*a* to the top surface of the fan cylinder device instead of being separated.

As a rack gear moving hole 200*j* is formed at each of both sides of the fan membrane extension moving pole moving hole 200*c*, the rack gear does not protrude and does not interrupt the vertical movement of the fan membrane extension moving pole 200*b* in which the rack gear is attached to both sides thereof.

Stators 200*d* are respectively mounted to the stator bodies 200*a*, rotators are rotatably respectively installed inside the stators, and the rotators are connected to a rotation shaft to be coupled and operated together.

A one-way gear is formed between the rotation shaft and the rotator to apply a load only when rotates in a forward direction and idle when rotates in a reverse direction.

A pinion gear 200*h* is formed at a center of the rotation shaft and connected with the rack gear formed at both sides of the fan membrane extension moving pole 200*b*. The fan membrane extension moving pole 200*b* and the rack gear 200*i* is moved together in the vertical direction, so that the pinion gear 200*h* rotates. A power is generated as the pinion gear allows the rotation shaft to rotate, and the rotator rotates inside the stator.

FIG. 12 is a plan view of the self-power generator 170 using five fan cylinders.

Figure 16:
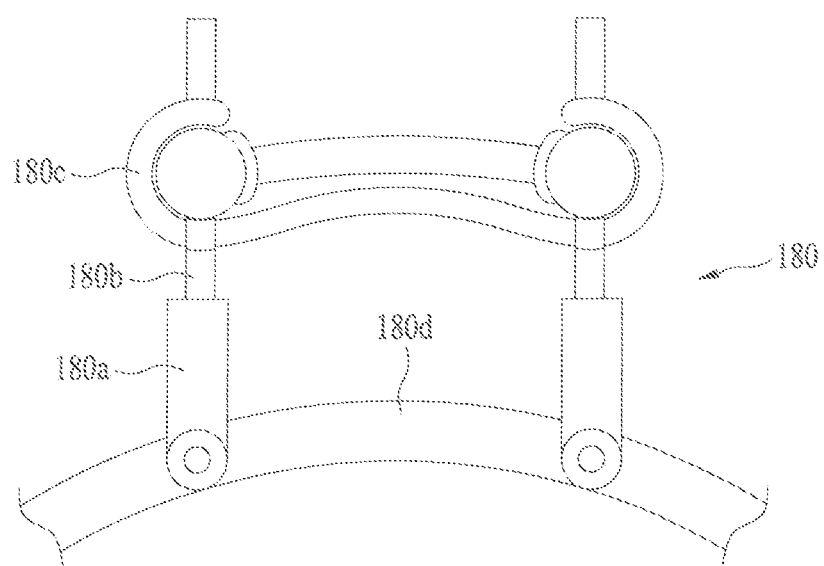
FIG. 16 is a side view illustrating a direction conversion device 180 of the rotation load wheel frame according to the present invention.

FIG. 16 is a side view of the rotation load wheel frame direction conversion device 180.

A base frame 180*d* for fixing and connecting the rotation load wheel frame direction conversion device 180 is attached and formed at each of the front, rear, and middle portions of the riding cylinder body, and two hydraulic cylinders 180*a* and two hydraulic cylinder load bars 180*b* are respectively mounted to both ends of the base frame.

As a connection member 180*c* for connecting the two hydraulic cylinder load bats 180*b* at one side of the rotation load wheel frame 120 fixes and attaches the rotation load wheel frame 120 in the horizontal direction, and the two hydraulic cylinder load bats 180*b* are respectively connected to both ends of the connection member 180*c* to push and pull the two hydraulic cylinder load bats, a direction of the rotation load wheel frame 120 may be converted into the left and right directions, and a direction of the driving wheel connected to the rotation load wheel frame may be also converted.

Figure 17:
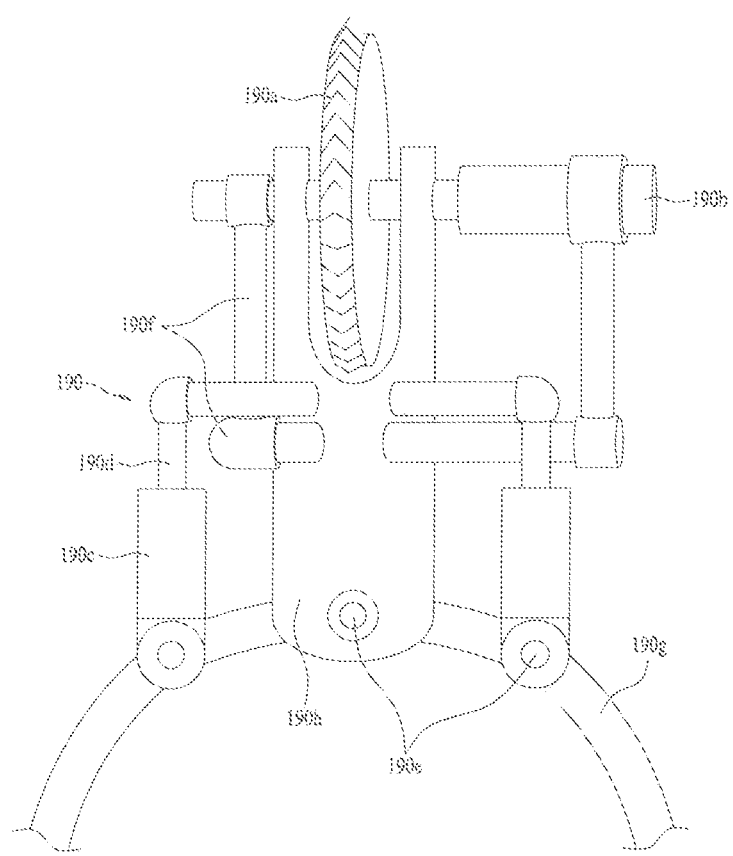
FIG. 17 is a side view illustrating the driving gear device 190 according to the present invention.

FIG. 17 is a side view of the driving gear device 190 providing a power to the driving wheel 130 while driving on the ground.

In the driving gear device 190, a base frame 190*g* for fixing the driving gear device to each of the front, rear, and middle portions of the riding cylinder body 110 is formed, and a driving gear mounting steel board 190*h* for attaching the driving gear 190*a* is attached to a central portion of the base frame. The driving gear 190*a* connected to the driving chain 130*d* formed in the driving wheel 130 to rotate the driving chain is fixed and attached onto the driving gear mounting steel board, and the driving gear is connected with an electric motor 190*b* to receive a power.

As two hydraulic cylinders 190*c* are attached to both ends of the base frame 190*g* fixed to the riding cylinder body 110, and the hydraulic cylinder load bats 190*d* connected to the hydraulic cylinders are respectively attached to both sides of the driving gear mounting steel board, a direction of the driving gear may be converted into the left and right directions by pushing and pulling of the two hydraulic cylinder load bats 190*d*.

As a rotation link 190*e* converted into the left and right directions as same as the hydraulic cylinder 190*c* is formed on the base frame 190*g* at a lower portion of the driving gear mounting steel board, directions of the driving gear and the hydraulic cylinder may be converted together into the left and right directions.

The driving gear transmits a driving force to the driving wheel by the electric motor connected to the driving gear after connected to the driving chain formed on the driving wheel.

The driving is stopped by stopping the electric motor and operating a breaking device. Even when the driving is stopped, the driving gear and the driving chain are continuously connected, and only rotation of the driving wheel is stopped by the breaking device.

In order to smoothly drive the flying car of the present invention on the ground, a direction of the driving gear device 190 is converted by the same angle and direction as the rotation load wheel frame direction conversion device 180.

Figure 18:
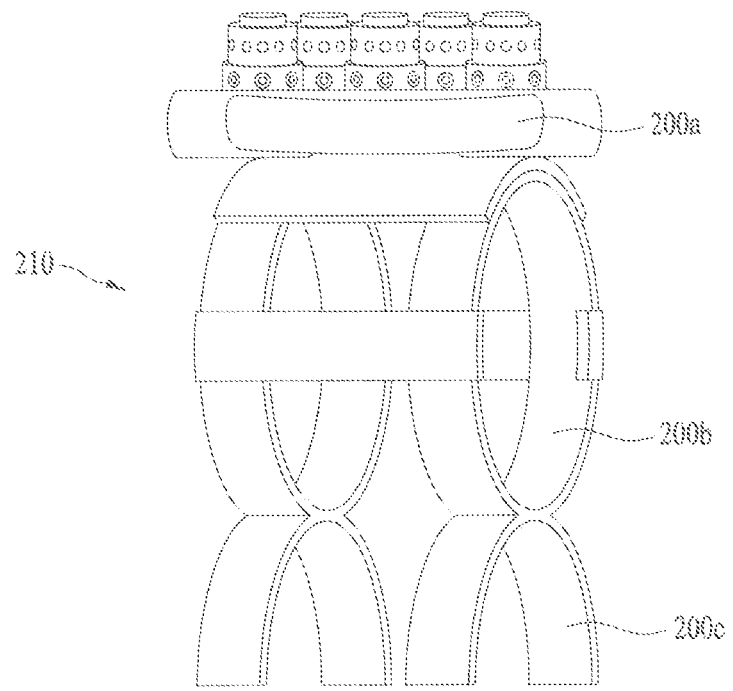
FIG. 18 is a side view illustrating an intermediate connection attaching and detaching frame device 210 according to the present invention.

FIG. 18 is a side view of the intermediate connection attaching and detaching frame device for connecting or separating the riding spherical body with a structure mounted thereto.

The intermediate connection attaching and detaching frame device is distinguished into an upper portion 210*a*, a middle portion 210*b*, and a lower portion 210*c*. The upper portion 210*a* includes an upper connecting and separating device to fix and separate a drone wing device 230 and a parachute capsule device 220 mounted to the upper portion of the riding cylindrical body, the middle portion 210*b* has a cylindrical tunnel shape to provide a space in which the driving wheel 130 and the rotation load wheel frame 120 rotate, and the lower portion 210*c* is connected and fixed to the horizontal safety frame 112 formed on the top surface of the riding cylindrical body and integrated with the riding cylindrical body.

Figure 19:
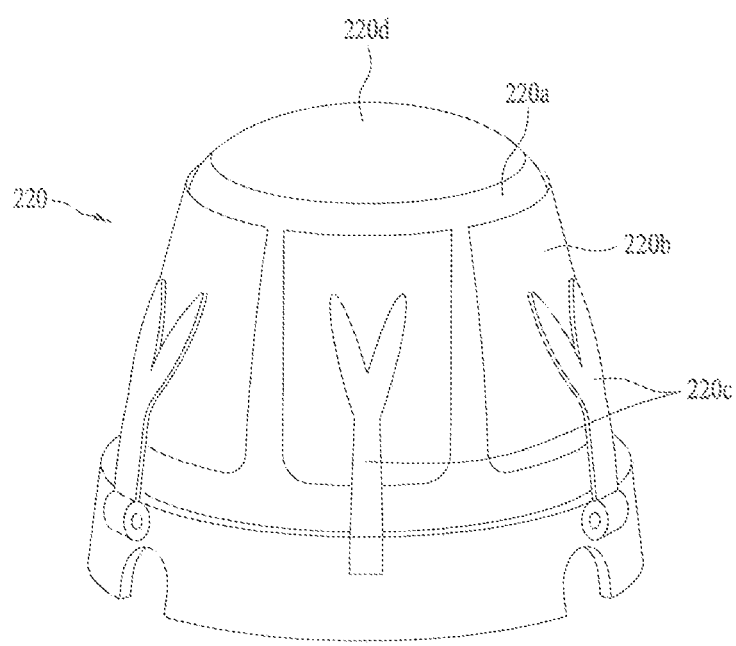
FIG. 19 is a side view illustrating a parachute capsule device 220 according to the present invention.

FIG. 19 is a side view of the parachute capsule device 220 including a large-sized parachute.

The parachute capsule device 220 includes a parachute 220*e* therein, five solar panels 220*b* are attached around the capsule to self-supply solar electric energy as a power, and a foldable frame 220*c* is attached to a rear surface thereof to minimize a usage space by folding the solar panel when the solar panel is not used.

The parachute capsule device 220 opens a lid 220*d* formed on a top surface of the capsule in case of emergency and unfolds the parachute 220*e* to allow a soft landing. An additional control rope is formed on the parachute to control a direction after the parachute is unfolded.

Figure 20:
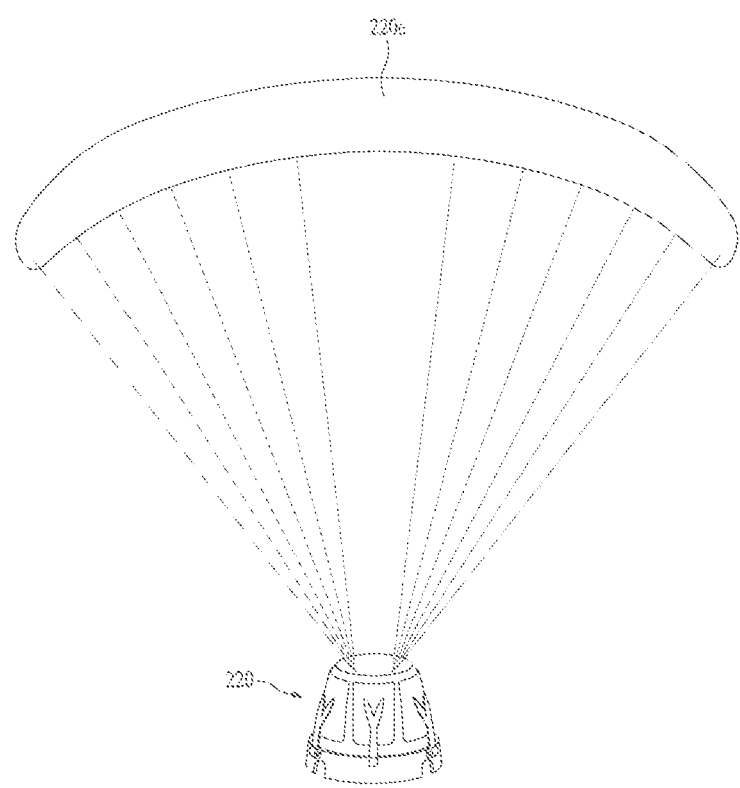
FIG. 20 is a side view illustrating an unfolded state of a parachute from a parachute capsule 220*a* according to the present invention.

FIG. 20 is a side view illustrating an unfolded state of the parachute of the parachute capsule device 220.

The drone wing device 230 mounted to the upper portion of the tiding cylindrical body 110 by the intermediate connection attaching and detaching frame device 210 includes five drone wings 230*a*, a drone wing protection frame, and an electric motor 230*c* for rotating the drone wing, and the parachute capsule device 220 is mounted to a central portion thereof so that the drone wing device 230 is folded in the vertical direction when driving on the ground.

Figure 21:
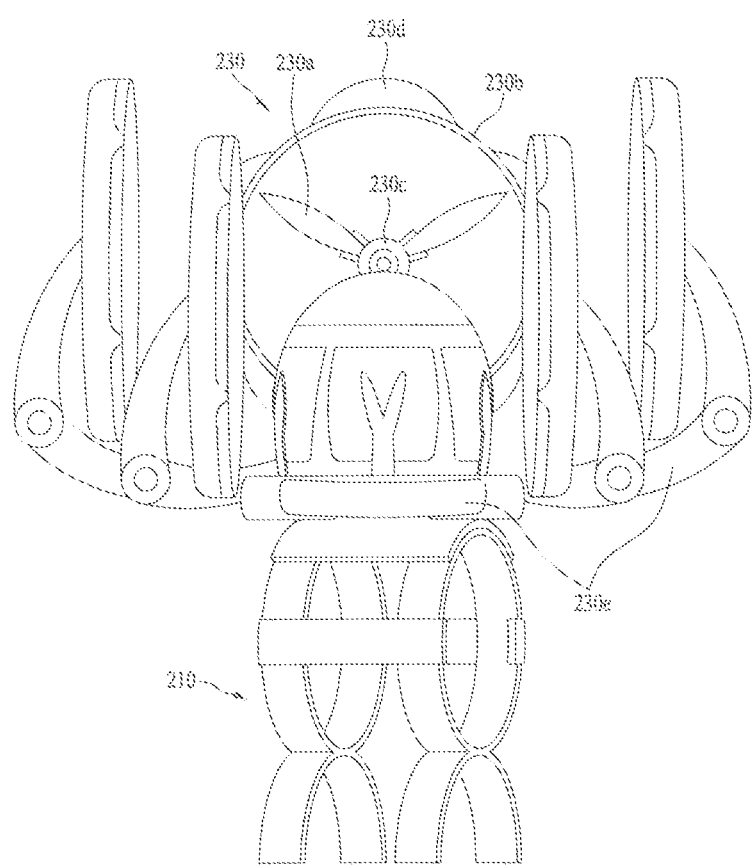
FIG. 21 is a view illustrating a state in which a drone wing device 230 and a parachute capsule device 220 formed on the riding cylindrical body 110 are connected to the intermediate connection attaching and detaching frame device 210 and then folded in a vertical direction according to the present invention.

FIG. 21 is a view illustrating a vertically folded state of the drone wing device 230.

The drone wing device is folded and restored by a hydraulic pressure to prevent collision with another vehicle in case of emergency or road driving and maintain a minimum space.

Figure 22:
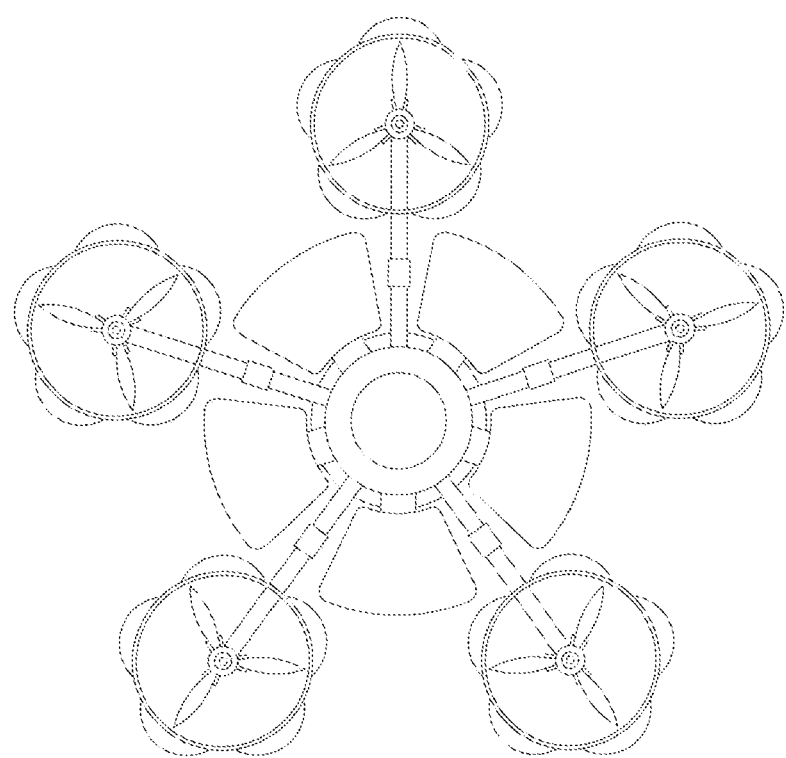
FIG. 22 is a view illustrating a state in which a drone wing device 230 and a solar panel of the parachute capsule device formed on the riding cylindrical body 110 are unfolded in a horizontal direction.

FIG. 22 is a plan view illustrating an unfolded state of five solar panels attached to the drone wing protection frame and the solar panels 220b attached around a parachute capsule 220a. The solar electric energy may be used as the power for driving.

Detailed operation and function of the flying car of the present invention will be described below.

The flying car of the present invention adopts the generally used and applied flight structure and function of a typical drone flying vehicle that uses the drone wing device to perform a vertical take-off and landing and a horizontal flight. Also, the flying car of the present invention is steered and operated by adopting the generally used and applied flying control system, actuation sensor, and steering controller system of the drone flying vehicle or the general airplane.

Since the flying car of the present invention drives on the ground by using electric energy, the flying car of the present invention is steered and operated by adopting the generally used structure device and function of the typical electric vehicle and adopts the generally used driving control system, actuation sensor, and controller of the typical electric vehicle.

The hydraulic cylinder and the device operated by a hydraulic pressure, which are mounted to the flying car of the present invention, adopts the generally used structure, function, and operation control system of the typical hydraulic pressure structure device.

The process of converting, operating, and distributing electricity generated by the self-power generator using the solar panel or the wind power into the power energy adopts the generally used structure device, function, and operation control system of the typical electric vehicle.

As an entrance is formed at each of both side surfaces of the riding cylindrical body 110, a person may enter therein.

As a front portion and a side portion of the riding cylindrical body 110 are made of a transparent material, a person may view in a front direction and a side direction.

Since the four auxiliary wheels for transporting and standing the riding cylindrical body are connected to one end of the shock absorber frame to perform a rotation function, the auxiliary wheels have risk of being separated or deviated during driving. To prevent the risk, the four auxiliary wheel shafts are connected to each other.

Since the flying car of the present invention rotates while the driving wheels inevitably surround an outer portion of the riding cylindrical body, the view in the front direction is not easily performed. To this end, a curved mirror is attached to each of both side surfaces of the riding cylindrical body 110 to view in the front direction and the rear direction. Thus, a monitor and a camera for viewing in the front direction are attached at a high position at the outside of the front of the riding cylindrical body 110 to monitor the front direction in the riding cylindrical body.

A steering wheel used during driving on the ground road is formed in the riding cylindrical body 110, and a separate control wheel is used during flying. Thus, the steering wheel is folded when the control wheel is used.

Electricity generated by the self-power generators 161, 170, and 200 using the wind power and the power of the fan membrane moving pole is supplied to operate all sorts of structures and devices, and the rest energy charges a separate battery attached at a lower portion of the riding cylindrical body 110.

As the parachute capsule 220a is opened to unfold the parachute 220e in case of emergency during flying, and the control rope of the parachute is operated to control a direction in the riding cylindrical body, the auxiliary wheels 140a and the driving wheels 130 are firstly landed on a safety area, so that the flying car is safely and softly landed.

[Description of reference numerals]

| | |
|---|---|
| 110: Riding spherical body | 111: Vertical safety frame of riding spherical body |
| 112: Horizontal safety frame of riding spherical body | |
| 113: Shock absorber frame mounting groove of riding spherical body | |
| 120: Rotation load wheel frame | 120a: Wheel frame |
| 120b: Bearing | 120c: Fixing wheel frame |
| 120d: Moving wheel frame | 120e: Connection member |
| 120f: Connection hole | 120g: Driving gear hole |
| 120h: Connection pin | 130: Driving wheel |
| 130a: Wheel frame | 130b: Connection member |
| 130c: Connection hole | 130d: Driving chain |
| 130e: Damping frame | 130f: Tire |
| 140: Auxiliary wheel shock absorber frame device | 140a: Auxiliary wheel |
| 140b: Female frame | 140c: Male frame |
| 140d: Spring of female and male frames | 140f: Outer spring of female and male frames |
| 140g: Auxiliary wheel shaft | 140h: Cylindrical protection blocking membrane |
| 150: Fan cylinder device | 150a: Fan cylinder |
| 150b: Fan membrane | 150c: First fan chamber |
| 150d: Second fan chamber | 150e: Fan membrane load hole |
| 150f: Fan membrane load pole | 150g: First fan chamber spring |
| 150h: Second fan chamber spring | 150i: Fan membrane moving pole |
| 150j: Air moving pipe | 150k: Air rotation plate |
| 150l: Compressed air discharge hole | 150m: Fan cylinder mounting circular plate |
| 160: Upper shock absorber frame device of riding spherical body | 160a: Female frame |
| 160b: Male frame | 160c: Spring of female and male frames |
| 160d: Outer spring | 160e: Bearing wheel |
| 160f: Bearing wheel fixing member | 160g: Fan membrane moving pole fixing member |
| 160h: Bearing wheel mounting circular plate | 160i: Fan cylinder mounting circular plate |
| 160j: Cylindrical protection blocking membrane | |
| 161: Self-power generator using one fan cylinder | |
| 161a: Fan cylinder | 161b: Fan membrane |

| [Description of reference numerals] | |
|---|---|
| 161c: First fan chamber | 161d: Second fan chamber |
| 161e: Fan membrane load pole | 161f: Fan membrane load hole |
| 161g: Spring of first and second fan chamber | 161h: Fan membrane moving pole |
| 161i: Air moving pipe | 161j: Air rotation plate |
| 161k: Power generator | 161l: Power generation housing |
| 162: Lower shock absorber frame device of riding spherical body and fan cylinder device | |
| 162a: Female frame | 162b: Male frame |
| 162c: Spring of female and male frames | 162d: Outer spring |
| 162e: Bearing wheel | 162f: Bearing wheel fixing member |
| 162g: Fan cylinder | 162h: Fan membrane |
| 162i: First fan chamber | 162j: Second fan chamber |
| 162k: Fan membrane load hole | 162l: Fan membrane load pole |
| 162m: Spring of fan chamber | |
| 162n: Fan membrane moving pole | 162p: Air moving pipe |
| 162q: Air rotation gear | 162r: Compressed air discharge hole |
| 162s: Fan membrane moving pole fixing member | |
| 162t: Bearing wheel mounting circular plate | |
| 162u: Fan cylinder mounting circular plate | 162w: Cylindrical protection blocking membrane |
| 170: Self-power generator using five fan cylinders | |
| 170a: Rotation gear pole | 170b: Rotation gear |
| 170c: Acceleration gear | 170d: Acceleration gear fixing frame |
| 170e: Power generator | |
| 180: Direction conversion device of rotation load wheel frame | |
| 180a: Hydraulic cylinder | 180b: Hydraulic cylinder load bar |
| 180c: Connection member | 180d: Base frame of direction conversion device |
| 190: Driving gear device | 190a: Driving gear |
| 190b: Electric motor | 190c: Direction conversion hydraulic cylinder |
| 190d: Direction conversion hydraulic cylinder load bar | |
| 190e: Rotation link of driving gear device | |
| 190f: Driving gear connection member | 190g: Base frame of driving gear device |
| 190h: Driving gear mounting rotation board | |
| 200: Self-power generator using movement force of fan membrane moving pole | |
| 200a: Stator body | 200b: Fan membrane extension moving pole |
| 200c: Fan membrane extension moving pole moving hole | 200d: Stator |
| 200e: Rotator | 200f: Rotation shaft |
| 200g: One-way gear | 200h: Pinion gear |
| 200i: Rack gear | 200j: Rack gear moving hole |
| 210: Intermediate connection attaching and detaching frame device | |
| 210a: Upper connection attaching and detaching member | |
| 210b: Intermediate connection member | 210c: Lower connection member |
| 220: Parachute capsule device | 220a: Parachute capsule |
| 220b: Solar panel of parachute capsule | 220c: Foldable frame of solar panel |
| 220d: Parachute capsule lid | 220e: Parachute |
| 220f: Operation button of parachute capsule lid | |
| 230: Drone wing device | 230a: Drone wing |
| 230b: Drone wing protection frame | 230c: Drone wing electric motor |
| 230d: Drone wing solar panel | 230e: Drone wing fixing and folding frame |

The invention claimed is:

1. A self-powered drone flying car for land and air, comprising:
 a riding spherical body (110) having a spherical shape to provide a space for flying, steering, transporting, and controlling;
 four auxiliary wheels (140*a*) attached to a lower both sides of the riding cylindrical body to vertically stand and move the riding cylindrical body;
 a shock absorber frame device (140,160,162) attached to each of the auxiliary wheels and upper and lower vertices of the riding cylindrical body to absorb a shock generated during driving;
 a fan cylinder device (150, 162) fixed and attached to the shock absorber frame device to generate a wind power;
 a self-power generator (161,170,200) configured to generate electricity by using a wind power generated from a fan membrane mounted and moved in the fan cylinder and a movement force of a fan membrane moving pole;
 a rotation load wheel frame device (120) having a shape of surrounding an outer portion of the riding cylindrical body (110) to provide a rotation load to a driving wheel (130) connected thereto;
 a direction conversion device (180) mounted to each of front, rear, and middle portions of the riding cylindrical body and connected with the rotation load wheel frame device (120) to convert a direction of each of the rotation load wheel frame device and the driving wheel (130) into left and right directions;
 a driving gear device (190) mounted to each of front, rear, and middle portions of the riding cylindrical body and then connected to a driving chain (130*d*) that is a driving transmission unit formed on an inner frame of the driving wheel;

five drone wing devices (230) connected to an upper portion of the riding cylindrical body to perform a vertical take-off and landing and a flight and vertically folded when driving on the ground or not used;

a parachute capsule device (220) formed on the upper portion of the riding cylindrical body to unfold a parachute contained therein, thereby performing a landing in case of emergency;

an intermediate connection attaching and detaching frame device (210) configured to connect and detach the drone wing device and the parachute capsule device formed on the upper portion of the riding cylindrical body therebetween.

2. The self-powered drone flying car of claim 1, wherein the riding cylindrical body (110) comprises:

a shock absorber frame mounting hole (113) configured to respectively insert shock absorber frame devices (160, 162) for shock damping to upper and lower vertices;

a vertical safety frame (111) fixed in a shape of surrounding the riding cylindrical body in vertical four directions from an upper point to a lower point of the riding cylindrical body in order to protect the riding cylindrical body (110) and attach the intermediate connection attaching and detaching frame device (210); and a horizontal safety frame (112) formed at each of the upper point and the lower point of the riding cylindrical body with a predetermined gap in order to protect the riding cylindrical body (110) and mount the intermediate connection attaching and detaching frame device (210), the direction conversion device (180), and the driving gear device.

3. The self-powered drone flying car of claim 1, wherein the shock absorber frame device (140,160,162) comprises two female and male frames (140*b*,140*c*,160*a*,160*b*,162*a*, 162*b*) that are engaged with each other, a shock damping spring (140*d*,160*c*,162*c*) disposed between the female and male frames, two cylindrical protection blocking membranes (160*j*,162*w*) configured to protect the female and male frames and the spring, and engaged and crossed due to different diameters and different directions of fixed ends thereof, a bearing wheel (160*e*,162*e*) for direction conversion, and a bearing wheel fixing member (160*f*,162*f*).

4. The self-powered drone flying car of claim 1, wherein the fan cylinder device (150, 162) comprises:

a cylindrical fan cylinder (150*a*,161*a*,162*d*) configured to seal air;

a fan membrane (150*b*,161*b*,162*h*) mounted in the fan cylinder to generate a wind power when moving;

a fan membrane load pole (150*f*,161*e*,162*l*) configured to provide a movement load of the fan membrane;

a fan membrane moving pole (150*i*,161*h*,162*n*) connected to the fan membrane to move the fan membrane;

a spring (150*g*,161*g*,162*m*) configured to restore the fan membrane after the fan membrane is moved;

an air moving pipe (150*j*,161*i*,162*p*) through which the wind power generated by the fan membrane is moved; and an air rotation plate (150*k*,161*j*) configured to rotate by the moving wind power formed in the air moving pipe.

5. The self-powered drone flying car of claim 1, wherein the self-power generator (161,170,200) comprises:

a cylindrical fan cylinder (150*a*,161*a*,162*g*) configured to seal air;

a fan membrane (150*b*,161*b*,162*h*) mounted in the fan cylinder in a horizontal direction and distinguished into a first fan chamber (150*c*,161*c*,162*i*) and a second fan chamber (150*d*,161*d*,162*j*), the fan membrane configured to generate a wind power or a movement force during moving;

two fan membrane load pole (150*f*,161*e*,162*l*) passing the fan membrane in the fan cylinder to provide a movement load;

a spring (150*g*,161*g*,162*m*) formed in a shape of surrounding the fan membrane load pole to restore the fan membrane after the fan membrane is moved;

an air moving pipe (150*j*,161*i*,162*p*) configured to connect the first fan chamber (150*c*,161*c*,162*i*) and the second fan chamber (150*d*,161*d*,162*j*);

an air rotation plate (150*k*,161*j*) formed in the air moving pipe;

a fan membrane moving pole (150*i*,161*h*,162*n*) having one end connected to the fan membrane and the other end connected to an auxiliary wheel shaft (140*g*) and the rotation load wheel frame (120) to repeatedly move the fan membrane in a vertical direction by using repeated movement energy generated during driving.

6. The self-powered drone flying car of claim 5, wherein the self-power generator (200) using a movement force of the fan membrane moving pole comprises:

a fan membrane extension moving pole (200*b*) fixed to an upper end of the fan membrane and extending to be exposed to the outside of the fan cylinder;

a fan membrane extension moving pole moving hole (200*c*) surrounding the fan membrane extension moving pole (200*b*) and configured to provide a movement load in a vertical direction;

a stator body (200*a*) in which the fan membrane extension moving pole moving hole (200*c*) is disposed at a central portion thereof, and one pair of stators (200*d*) are fixed and coupled to both sides thereof;

a rack gear moving hole (200*j*) formed at both sides of the fan membrane extension moving pole moving hole (200*c*) to allow a rack gear (200*i*) to protrude and move;

one pair of rotators (200*e*) installed inside the stator in a rotatable manner;

a rotation shaft (200*f*) coupled with the one pair of rotators in an integrated manner;

a one-way gear (200*g*) formed between the rotation shaft and the rotator to apply a load only when rotates in a forward direction and idle when rotates in a reverse direction;

a pinion gear (200*h*) formed at a center of the rotation shaft; and the rack gear (200*i*) fixed to both sides of the fan membrane moving pole and engaged with the pinion gear.

7. The self-powered drone flying car of claim 1, wherein the rotation load wheel frame (120) comprises:

a circular wheel frame (120*a*);

a circular fixing wheel frame (120*c*) fixed to both ends of the wheel frame (120*a*);

a circular moving wheel frame (120*d*) which is inserted into the fixing wheel frame and connected with the driving wheel (130) and in which ball bearings are consecutively embedded; and connection members (120*e*) protruding and spaced a predetermined distance from each other along a rounded upper portion of the moving wheel frame as a unit for being connected with the driving wheel (130).

8. The self-powered drone flying car of claim 1, wherein the driving wheel (130) comprises:
- a circular wheel frame (130a);
- a driving chain (130d) attached along the rounded inside of the wheel frame (130a) as a unit for being connected with a driving gear (190a);
- a damping frame (130e) and a tire (130f), which are formed on an outer portion of the wheel frame and cut by a predetermined distance to damp a shock during driving; and
- connection holes (130c) spaced a predetermined distance from each other inside the wheel frame, and protruding connection members (130b) as a unit for being connected with the rotation load wheel frame (120).

9. The self-powered drone flying car of claim 1, wherein the rotation load wheel frame direction conversion device (180) comprises:
- a base frame (180d) fixed to each of front and rear portions of the riding cylindrical body to connect two hydraulic cylinders (180a) to a rotation link;
- a connection member (180c) fixed to both front and rear sides of the rotation load wheel frame in a horizontal direction to rotate the rotation load wheel frame in left and right directions as a unit for being connected with a hydraulic cylinder load bar (180b); and
- the hydraulic cylinder (180a) and the hydraulic cylinder load bar (180b) connected with the connection member (180c) to push and pull the rotation load wheel frame so that the rotation load wheel frame rotates in the left and right directions.

10. The self-powered drone flying car of claim 1, wherein the driving gear device (190) comprises:
- a base frame (190g) fixed to each of front and rear portions of the riding cylindrical body to connect each of two hydraulic cylinders (190c) and a rotation board (190h) by using a rotation link;
- a connection member (190f) fixed between a driving gear (190a) and the rotation board (190h) and connected with a hydraulic cylinder load bar (190d); and
- the hydraulic cylinder (190c) and the hydraulic cylinder load bar (190d) connected with the rotation board (190h) to push and pull the driving gear (190a) so that the driving gear (190a) rotates in left and right directions.

11. The self-powered drone flying car of claim 1, wherein the drone wing device (230) comprises:
- five circular drone wing protection frames (230b) to which five semi-circular solar panels (230d) spaced a predetermined distance from each other are attached along an outer portion of the frame in a horizontal direction;
- a drone wing (230a) formed inside the drone wing protection frame;
- a drone wing electric motor (230c) configured to provide a power to the drone wing; and
- a foldable frame (230e) formed on a lower portion of the drone wing protection frame (230b) and folded in vertical and horizontal directions.

12. The self-powered drone flying car of claim 1, wherein the parachute capsule device (220) comprises:
- a parachute capsule (220a) in which five solar panels (220b) folded in vertical and horizontal directions are attached to an outer portion thereof with a predetermined distance and which comprises a parachute (220e) therein; and
- a parachute capsule lid (220d) formed at an upper portion of the parachute capsule and opened by an operation button in case of emergency to unfold the parachute.

13. The self-powered drone flying car of claim 1, wherein the intermediate connection attaching and detaching frame device (210) comprises:
- an upper connection attaching and detaching member (210a) configured to attach and detach the drone wing device (230) and the parachute capsule device (220) formed on an upper portion of the riding cylindrical body;
- an intermediate connection member (210b) having a cylindrical tunnel shape having a size allowing the driving wheel (130) connected with the rotation load wheel frame (120) to pass therethrough, and connected to a lower portion of the upper connection attaching and detaching member (210a); and
- a lower connection member (210c) connected to a lower portion of the intermediate connection member (210b) and connected to the upper portion of the riding cylindrical body, thereby connecting the riding cylindrical body with a ground driving device.

\* \* \* \* \*